United States Patent Office 3,194,769
Patented July 13, 1965

3,194,769
REACTIVATION OF ALKALI-METAL SULFATE CATALYST
Arthur L. Maloy, South Charleston, Charles R. Maloney, Charleston, and James O. Hambrick, St. Albans, W. Va., assignors to Union Carbide Corporation, a corporation of New York
No Drawing. Original application Nov. 19, 1956, Ser. No. 622,837. Divided and this application Sept. 7, 1962, Ser. No. 222,199
10 Claims. (Cl. 252—413)

This invention relates to chemical processes. More particularly it is directed to an improved process for producing styrene. This application is a division of copending U.S. application Serial No. 622,837 filed November 19, 1956, now abandoned.

It is well known that phenyl methyl carbinol can be dehydrated catalytically to form styrene and a number of catalysts have been proposed for this purpose. In the processes employing catalysts heretofore known, however, the styrene thus obtained had contained small but appreciable amounts of impurities, particularly ethyl benzene, in amounts from 0.6 to 1 percent by weight. Ethyl benzene had a boiling point so close to styrene that its removal is extremely difficult. When present in quantities of 0.6 percent by weight or more of the styrene, ethyl benzene can be removed only by a series of distillation steps which can increase considerably the cost of the purified styrene.

We have now discovered a class of catalysts for the vapor phase dehydration of phenyl methyl carbinol which cause the process to yield styrene of a purity of 99.6 percent by weight or better and containing less than 0.4 percent by weight of ethyl benzene, with an efficiency above 90 percent, with good conversion. Styrene of a purity of 99.7 percent by weight or better may be readily obtained by the process of the invention. Styrene of such high quality is ready for polymerization or other use when distilled from the reaction product mixture of our process.

The catalysts of our invention are based upon our discovery that sulfuric acid vapor is an excellent catalytic agent for the dehydration of phenyl methyl carbinol to styrene. In one embodiment of our invention, vaporous $H_2SO_4$ is fed into a reaction chamber together with vaporous phenyl methyl carbinol, the temperature in the reaction chamber being high enough to cause dehydration of the phenyl methyl carbinol. In another embodiment of the invention a sulfur compound capable of yielding $H_2SO_4$, such as sulfur trioxide or a lower alkyl sulfate, is passed into a reaction chamber together with vaporous phenyl methyl carbinol, the temperature in the reaction chamber being high enough to cause formation of $H_2SO_4$ from the sulfur compound and to cause dehydration of the phenyl methyl carbinol. Preferably the reaction chamber contains an inert material to serve as a reaction surface for the dehydration reaction.

In yet another embodiment of the invention a solid catalyst is used. This catalyst is a mixture of an alkali metal sulfate and an alkali metal acid sulfate, preferably supported on an inert carrier such as fused aluminum oxide or inert bonded silica. The reaction chamber is maintained at a temperature sufficiently elevated to cause formation of the $H_2SO_4$ from the solid catalyst and to cause dehydration of the phenyl methyl carbinol. We have further discovered and claim as another embodiment of our invention, the reactivation of our solid catalyst. This may be accomplished by exposing spent catalyst to contact with $H_2SO_4$ or a sulfur compound capable of yielding $H_2SO_4$ under conditions such as to cause the formation of $H_2SO_4$, for a time sufficient to reactivate the catalyst. We have further discovered that when phenyl methyl carbinol is dehydrated to styrene by passing it in the vaporous state over a solid alkali metal sulfate-alkali metal acid sulfate catalyst, the life of the catalyst can be greatly prolonged by introducing a small quantity of $H_2SO_4$ vapor into the reaction chamber together with the phenyl methyl carbinol. A sulfur compound capable of forming $H_2SO_4$ may also be used for this purpose, according to our invention.

Yet another embodiment of our invention is the use of a solid alkali metal sulfate, preferably on an inert carrier, activated by $H_2SO_4$ as the catalyst. In this embodiment of the invention phenyl methyl carbinol in the vapor phase, together with $H_2SO_4$ or a sulfur compound capable of forming $H_2SO_4$, is passed through a bed comprising particles of solid alkali metal sulfate, at a temperature sufficiently elevated to cause dehydration of the phenyl methyl carbinol.

We do not wish to be bound by any theory of the catalysis involved, but believe that the availability of sulfuric acid in the various embodiments of the invention stated above can be predicated on the reactions below, in view of the fact that water from the dehydration of phenyl methyl carbinol is available. In the case of our catalysts which are assumed to form $H_2SO_4$, the presence of water for this purpose at the very beginning of the reaction can be explained by the fact that when phenyl methyl carbinol is heated to elevated temperatures, dehydration of it to styrene will occur to a relatively slight degree, with the consequent release of water, even in the absence of a catalyst.

The possible mechanisms for the formation of sulfuric acid are as follows:

In the case of sulfur trioxide:

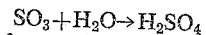

In the case of an alkali metal acid sulfate, i.e. $NaHSO_4$:

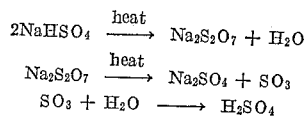

or, since $H_2O$ is always present,

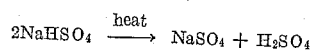

In the case of a lower alkyl sulfate, i.e. ethyl sulfate:

$$(C_2H_5)_2SO_4 + 2H_2O \rightarrow 2C_2H_5OH + H_2SO_4$$

and/or

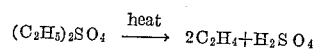

In the case of the inactivation of inert $Na_2SO_4$ by $H_2SO_4$ or the reactivation of spent $Na_2SO_4$—$NaHSO_4$ catalyst the following reaction may be postulated:

$$Na_2SO_4 + H_2SO_4 \rightarrow 2NaHSO_4$$

The catalytic dehydration process of the invention in all embodiments is operated at a temperature sufficiently elevated to cause dehydration of the phenyl methyl carbinol and, when using catalytic materials other than sulfuric acid, sufficiently elevated to cause formation of sulfuric acid. The process of the invention is operable over a temperature range from 180° C. to 300° C. The preferred operating temperature range for the greatest efficiency is between 210° C. and 225° C. When the process is operated at temperatures below 210° C. the percentage of alpha-methyl benzyl ether, an undesirable by-product, produced is increased. Operating temperatures above 225° C. promote the production of undesirable styrene dimer and polymer, thereby lowering the useful efficiency of the process. The process is operable at atmospheric pressure.

The process is operated in the vaporous phase as a continuous process and any equipment suitable for this type of reaction may be employed. When the catalyst is sulfuric acid vapor or the vapor of a compound capable of forming sulfuric acid, it is essential only that the vapors of the catalyst be commingled, in the proper proportions, with the feed vapor containing phenyl methyl carbinol. For optimum styrene purity and maximum efficiency of the process we have found that when sulfuric acid vapor is used as the catalyst, a concentration of about 60 parts per million by weight of sulfuric acid per part of phenyl methyl carbinol in the feed is preferred. A minimum concentration of 10 parts per million is essential for successful operation of the process and concentrations above 100 parts per million produce no further benefits in the process.

When sulfur trioxide is introduced as catalytic material with the feed, a concentration of from 10 to 150 parts per million by weight of sulfur trioxide per part of phenyl methyl carbinol is operable. A concentration of about 60 parts per million is preferred. With the lower alkyls, such as (di)ethyl sulfate, a concentration of from 20 to 150 parts per million by weight of lower alkyl sulfate per part of phenyl methyl carbinol is operative. A concentration of about 100 parts per million is preferred. Suitable lower alkyl sulfates include, dimethyl sulfate, methyl hydrogen sulfate, diethyl sulfate and diisopropyl sulfate.

When employing the above vaporous catalysts it is possible and in some ways desirable to employ a bed of inert material, such as fused inert silica or fused inert aluminum oxide, as a reaction surface for the catalytic dehydration. Such inert materials, preferably in the form of small spheres or ovoids or the like, can be placed in the reaction vessel and the vaporous mixture of catalytic materials and feed containing phenyl methyl carbinol passed through the bed.

In other embodiments a solid catalyst is used. A catalyst according to the invention is a mixture of an alkali metal sulfate and an alkali metal acid sulfate supported on an inert carrier. Such sulfates and acid sulfates include $Li_2SO_4$, $LiHSO_4$, $Na_2SO_4$, $NaHSO_4$, $K_2SO_4$, $KHSO_4$, $Rb_2SO_4$ and $RbHSO_4$. Our most preferred catalyst is a mixture of sodium sulfate and sodium acid sulfate. Another preferred catalyst is a mixture of potassium sulfate and potassium acid sulfate. We have found that either "technical" grade or "chemically pure" grade sulfate salts can be used with approximately equal good results. In the examples recorded below "chemically pure" grade salts were employed. It is essential that in the particular catalyst employed, the sulfate and the acid sulfate be of the same metal. The inert material employed as a catalyst base may be any inert material upon which the alkali metal salts can be deposited, and is preferably used in the form of small pellets such as spheres, ovoids or like shapes. Suitable inert materials include fused silica, fused aluminum oxide, fused silicon carbide, bonded aluminum oxide, bonded silica, inert ceramic materials and the like.

The relative percentages of the alkali metal sulfate and alkali metal acid sulfate are not narrowly critical. We have found mixtures ranging from 1 part by weight alkali metal sulfate and 19 parts alkali metal acid sulfate to 19 parts by weight alkali metal sulfate and 1 part alkali metal acid sulfate to be operative in the process. The size of the catalyst pellets or particles is not narrowly critical. We have found that pellets ranging from ⅛ to ½ inch in approximate diameter, or from 8 to 2 mesh, to be quite suitable. A mixture consisting of about one part alkali metal sulfate and about one part alkali metal acid sulfate is preferred. In this regard it should be noted that an alkali metal sulfate alone is inactive as a catalyst whereas an alkali metal acid sulfate alone is too active and is too rapidly "spent" or rendered inert and non-catalytic. The relative quantity of alkali metal sulfate-acid sulfate mixture deposited on the inert carrier is likewise not critical. A ratio of about one part by weight of sulfate-acid sulfate mixture to about 4 parts by weight of inert carrier is preferred.

The solid catalysts according to the invention may be made in the following manner. The salts, that is the alkali metal sulfate and alkali metal acid sulfate, are weighed out in the necessary quantity for the salt mixture desired. The salts are then dissolved in water, preferably distilled water and preferably at a temperature of about 95° C. to 100° C., the weight ratio of water to anhydrous salts being about 1 to 1.15. This aqueous solution of the salts is then mixed with the selected inert material, the quantity of each being such as to give the desired weight ratio of salt mixture to inert carrier material. This mixture is then, with constant agitation, evaporated to dryness, preferably at a temperature of about 95° C. to 100° C. The finished catalyst thus produced will have the salts tightly bonded to the inert carrier material.

The quantity of catalytic salt mixture per unit volume of reaction space is not narrowly critical and will depend upon the weight ratio of sulfate to acid sulfate, the weight ratio of sulfate-acid sulfate mixture to inert carrier material and the surface area of the catalyst which is dependent on the size and shape of the individual particles. It is well within the scope of one skilled in the art to determine the exact quantity required. It can be stated however, that, using a 1 to 1 weight ratio of sulfate to acid sulfate and a 1 to 4 weight ratio of salt mixture to inert material, from 9,000 to 18,000 square inches of catalytic surface should be provided for each cubic foot of reactor volume.

The above described solid catalysts of the invention have greatly extended catalyst life. A catalyst life of 500 hours or more is possible. We have further discovered that the life of the solid catalyst can be readily extended to 2000 hours or more by adding to the phenyl methyl carbinol feed mixture a small quantity of one of the vapor catalysts described above, before passing it over the solid catalyst. For this purpose from 5 to 100 parts per million by weight of sulfuric acid per part of phenyl methyl carbinol are effective. From 5 to 100 parts per million by weight of sulfur trioxide per part of phenyl methyl carbinol can be used. With the lower alkyl sulfates, from 10 to 50 parts per million by weight of alkyl sulfate per part of phenyl methyl carbinol are employed. Suitable lower alkyl sulfates include dimethyl sulfate, methyl hydrogen sulfate, diethyl sulfate and diisopropyl sulfate.

Whether the additional vapor catalyst is employed or not, the solid alkali metal sulfate-alkali metal acid sulfate catalyst will eventualy become inert and lose its catalytic activity, or as it is known, become "spent." While we do not wish to be bound by any theory of the mechanism involved, we believe that the catalyst becomes spent due to the loss of sulfur trioxide and water, which becomes sulfuric acid, from the alkali metal acid sulfate, which itself is converted to the alkali metal sulfate. This can be illustrated by the following equations:

$$2NaHSO_4 \rightarrow Na_2S_2O_7 + O$$

$$Na_2S_2O_7 \rightarrow Na_2SO_4 + SO_3$$

We have now found that the spent catalyst of the alkali metal sulfate-alkali metal acid sulfate type of our invention can be reactivated and restored to catalytic activity by contacting the spent catalyst mass with sulfuric acid or with a compound capable of yielding sulfuric acid. Preferably this is done by passing vapors of such a compound through the bed of spent catalyst at an elevated temperature, say 100° C. to 250° C. For convenience and ease in handling the vapors of the reactivating compound can be diluted, if desired, with an inert gas such as nitrogen. For example, such a spent catalyst bed can be effectively reactivated by passing through it for a period of about 2 hours a stream of nitrogen containing from 100 to 300 parts per million by weight of vaporous sulfuric acid per part of nitrogen, about 150 parts per million is preferred. Similarly a stream of nitrogen containing from 100 to 300 parts per million by weight of vaporous sulfur trioxide, 150 parts per million preferred or from 100 to 300 parts per million by weight of vaporous lower alkyl sulfate, 200 parts per million preferred, per part of nitrogen can be passed through a spent bed for a period of from 1 to 6 hours. Suitable lower alkyl sulfates include dimethyl sulfate, methyl hydrogen sulfate, diethyl sulfate and diisopropyl sulfate. During the reactivation process a temperature of from 200 to 225° C. is preferably maintained in the chamber containing the spent catalyst.

As stated above, an alkali metal sulfate, such as $Na_2SO_4$, alone does not have any catalytic activity and hence is useless as a catalyst. We have discovered, however, that if a catalyst bed, made similarly to the solid catalyst described above having only the alkali metal sulfate (no alkali metal acid sulfate) deposited on the inert carrier, is employed in the process, it will become activated and serve as a catalyst if a small quantity of vaporous sulfuric acid or a vaporized compound capable of forming sulfuric acid, is mixed with the phenyl methyl carbinol fed mixture before it is passed over the catalyst bed. For this purpose, from 10 to 100 parts per million by weight of sulfuric acid, 20 parts per million preferred, from 10 to 100 parts per million by weight of vaporized sulfur trioxide, 20 parts per million preferred, or from 20 to 150 parts per million of a vaporized lower alkyl sulfate, 60 parts per million preferred, per part of phenyl methyl carbinol may be employed. Suitable lower alkyl sulfates include dimethyl sulfate, methyl hydrogen sulfate, diethyl sulfate and diisopropyl sulfate.

In the above described embodiment inasmuch as the alkali metal sulfate alone is not catalytic the rate of conversion will be undesirably slow when the feed mixture containing phenyl methyl carbinol and sulfuric acid or a compound capable of forming it is first passed over the sulfate. This is presumably due to the reaction of the sulfuric acid with the sodium sulfate to form sodium acid sulfate, an equilibrium being eventually achieved. In order to avoid this lag in conversion it is desirable, before introducing the phenyl methyl carbinol feed, to first pass vaporous sulfuric acid or a vaporous compound capable of forming sulfuric acid over the alkali metal sulfate for a period of about 2 hours at an elevated temperature, say 100° C. to 250° C. For convenience and ease in handling, these vapors may be diluted if desired with an inert gas such as nitrogen. For example, a stream of nitrogen containing from 100 to 300 parts per million by weight of sulfuric acid per part of nitrogen, with about 150 parts per million preferred may be passed through the alkali metal sulfate bed for a period of about 2 hours. Similarly, a stream of nitrogen containing from 100 to 300 parts per million by weight of vaporous sulfur trioxide, 150 parts per million preferred, or from 100 to 200 parts per million by weight of vaporous lower alkyl sulfate, 200 parts per million preferred, per part of nitrogen can be passed through a bed of alkali metal sulfate for a period of from 1 to 6 hours. Suitable alkyl sulfates include diethyl sulfate, methyl hydrogen sulfate, diethyl sulfate and diisopropyl sulfate. For this activation step a temperature of from 200° C. to 225° C. is preferred.

Such a catalyst bed of alkali metal sulfate may be made in the following manner. The desired weight of alkali metal sulfate is dissolved in water, preferably distilled water, and preferably at a temperature of about 95° C. to 100° C., the weight ratio of water to anhydrous salt being about 1 to 1.5. This aqueous solution of the alkali metal sulfate salt is then mixed with the selected inert material, the quantity of each being such as to give the desired weight ratio of salt to inert carrier material. While this latter ratio is not extremely critical, a ratio of about one part by weight of alkali metal sulfate to 4 parts by weight of inert carrier has been found to be very effective. The mixture is then, with constant agitation, evaporated to dryness, preferably at a temperature of about 95° C. to 100° C. The material thus produced will have the salts tightly bonded to the inert carrier material. Using a 1 to 4 weight ratio of alkali metal sulfate to inert carrier, from 9,000 to 18,000 square inches of surface of the sulfate impregnated, inert material should be provided for each cubic foot of reactor volume. The size of the pellets or particles thus produced is not narrowly critical. We have found that pellets ranging from ⅛ to ½ inch in approximate diameter, or from 8 to 2 mesh, to be quite suitable.

The purity of the styrene obtainable according to any of the embodiments of this invention is not adversely affected by the presence of phenyl methyl ketone in the feed, at least not in amounts up to 35 percent by weight of the feed. Thus the process is particularly well adapted to operate on the crude penyl methyl carbinol obtained by the hydrogenation of phenyl methyl ketone and containing substantial amounts of unchanged phenyl methyl ketone. The phenyl methyl ketone passes substantially unchanged through the phenyl methyl carbinol dehydration reaction and may be recovered from the styrene product.

In our experiments, we have found that mixtures containing as little as 65 percent by weight phenyl methyl carbinol with 35 percent phenyl methyl ketone could be employed with no detrimental effect on the catalyst or the product. However, concentrations of phenyl methyl carbinol lower than 65 percent by weight result in loss of efficiency due to condensation of the ketones to form residues. Feed mixtures containing more than 80 percent phenyl methyl carbinol were found to be preferable. In all the embodiments of our process we recovered styrene from the styrene product mixture of the process in purities of 99.6 percent by weight or better in the following manner. The converter product of the reaction was charged to a kettle and distilled in a column of 10 theoretical plates. The water of reaction formed was removed by means of a decanting head affixed to the column after which the styrene product was removed at a 5 to 1 reflux ratio at a temperature of 145.2° C.

In our experimental work, including the examples given below, we determined the purity of the styrene product either by mass spectrometer analysis or by the freezing point method described by the U.S. Bureau of Standards. The particular method employed in each example is indicated therein.

*Example I*

A catalyst was prepared in the following manner. One part by weight of sodium sulfate was mixed with one part by weight of sodium acid sulfate. One part by weight of this mixture was then dissolved in 1.5 parts by weight of distilled water at a temperature between 95° C. and 100° C. This solution was mixed with 4 parts by weight of a carrier consisting of approximately 2 x 4 mesh size ovoid shaped fused aluminum oxide pellets. This mixture was evaporated to dryness with constant agitation, employing a temperature of about 120° C. The catalyst pellets thus obtained were white in color and had the salts bonded tightly to the carrier.

*Example II*

A catalyst was prepared in the following manner. One part by weight of potassium sulfate was mixed with 5.6 parts by weight of potassium acid sulfate. One part by weight of this mixture was then dissolved in 1.5 parts by weight of distilled water at a temperature between 95° and 100° C. This solution was mixed with 4 parts by weight of a carrier consisting of approximately 2 x 4 mesh size bonded inert silica pellets. This mixture was evaporated to dryness with constant agitation, employing a temperature of about 120° C. The catalyst pellets thus obtained had the salts bonded tightly to the carrier.

*Example III*

A catalyst was prepared in the following manner. One part by weight of sodium sulfate was mixed with one part by weight of sodium acid sulfate. One part by weight of this mixture was then dissolved in 1.5 parts by weight of distilled water at a temperature between 95° C. and 100° C. This solution was mixed with 4 parts by weight of a carrier consisting of approximately 2 x 4 mesh size bonded inert silica pellets. This mixture was evaporated to dryness with constant agitation, employing a temperature of about 120° C. The catalyst pellets thus obtained had the salts bonded tightly to the carrier.

*Example IV*

A catalyst bed was prepared in the following manner. One part by weight of sodium sulfate was dissolved in 1.5 parts by weight of distilled water at a temperature between 95° C. and 100° C. This solution was mixed with 4 parts by weight of a carrier consisting of approximately 2 x 4 mesh size bonded inert silica pellets. This mixture was evaporated to dryness with constant agitation, employing a temperature of about 120° C. The catalyst pellets thus obtained had the salt bonded tightly to the carrier.

*Example V*

A feed mixture consisting of 4 parts by weight of phenyl methyl carbinol and one part by weight of phenyl methyl ketone was vaporized and the vapor was passed through a catalyst bed maintained at a temperature of 210° C. The catalyst was a mixture of sodium sulfate and sodium acid sulfate, in a one to one weight ratio, deposited on fused aluminum oxide as described in Example I.

The reaction vessel consisted of a vertical stainless steel converter tube 36 inches in length and having an inside diameter of one inch. The converter tube was equipped with a one-quarter inch outside diameter stainless steel thermowell and was heated by means of an electrically controlled liquid-vapor heat exchange jacket. Three hundred cubic centimeters of catalyst were charged to the bottom of the converter tube and the upper portion of the tube was packed with inert support material, which latter material acted as a vaporizer for the incoming phenyl methyl carbinol in the feed. The feed rate to the converter tube was such that 300 grams of feed mixture were passed through the catalyst bed in a period of one hour.

The yield of the process for a three hour run was as follows:

| Component: | Parts by weight |
| --- | --- |
| Styrene | 63.85 |
| Phenyl methyl ketone | 20.03 |
| Phenyl methyl carbinol | 7.34 |
| Residues | 4.79 |
| Styrene dimer | 3.88 |
| Ethyl benzene | 0.06 |
| | 100.00 |

The product mixture contained no alpha-methyl benzyl ether. The percentage dehydration of phenyl methyl carbinol to styrene was 79.9 percent by weight. The purity of the styrene product was 99.90 percent, as determined by mass spectrometer analysis.

*Example VI*

A feed mixture consisting of 4 parts by weight of phenyl methyl carbinol and one part by weight of phenyl methyl ketone was vaporized and the vapor was passed through a catalyst bed maintained at a temperature of 210° C. The catalyst was a mixture of sodium sulfate and sodium acid sulfate, in a one to one weight ratio, deposited on bonded inert silica as described in Example III.

The reaction vessel consisted of a vertical stainless steel converter tube 36 inches in length and having an inside diameter of one inch. The converter tube was equipped with a one-quarter inch outside diameter stainless steel thermowell and was heated by means of an electrically controlled liquid-vapor heat exchange jacket. Three hundred cubic centimeters of catalyst were charged to the bottom of the converter tube and the upper portion of the tube was packed with inert support material, which latter material acted as a vaporizer for the incoming phenyl methyl carbinol in the feed. The feed rate to the converter tube was such that 300 grams of feed mixture were passed through the catalyst bed in a period of one hour.

During 114 hours of continuous operation the average percent of dehydration of phenyl methyl carbinol to styrene was 85 percent by weight. The purity of the styrene thus produced was 99.84 percent, as determined by mass spectrometer analysis.

*Example VII*

A feed mixture consisting of 6.2 parts by weight of phenyl methyl carbinol and 3.8 parts by weight of phenyl methyl ketone was vaporized and the vapor was passed through a catalyst bed maintained at a temperature of 210° C. The catalyst was a mixture of 5.6 parts by weight of potassium acid sulfate and one part by weight of potassium sulfate, deposited on bonded inert silica as described in Example II.

The reaction vessel consisted of a vertical stainless steel converter tube 36 inches in length and having an inside diameter of one inch. The converter tube was equipped with a one-quarter inch outside diameter stainless steel thermowell and was heated by means of an electrically controlled liquid-vapor heat exchange jacket. Three hundred cubic centimeters of catalyst were charged to the bottom of the converter tube and the upper portion of the tube was packed with inert support material, which latter material acted as a vaporizer for the incoming phenyl methyl carbinol in the feed. The feed rate to the converter tube was such that 300 grams of feed mixture were passed through the catalyst bed in a period of one hour.

During 22 hours of continuous operation the average percentage of dehydration of phenyl methyl carbinol to styrene was 75 percent by weight. The purity of the styrene thus produced was 99.8 percent, as determined by mass spectrometer analysis.

*Example VIII*

A feed mixture consisting of 73.03 parts by weight of phenyl methyl carbinol and 26.97 parts by weight of phenyl methyl ketone was vaporized and the vapor was passed through a catalyst bed maintained at a temperature of 210° C. The catalyst was a mixture of sodium sulfate and sodium acid sulfate, in a one to one weight ratio, deposited on fused aluminum oxide as described in Example I.

The reaction vessel consisted of a vertical stainless steel converter tube 36 inches in length and having an inside diameter of one inch. The converter tube was equipped with a one-quarter inch outside diameter stainless steel thermowell and was heated by means of an electrically controlled liquid-vapor heat exchange jacket. Three hundred cubic centimeters of catalyst were charged to the bottom of the converter tube and the upper portion of the tube was packed with inert support material, which latter material acted as a vaporizer for the incoming phenyl methyl carbinol in the feed. The feed rate to the converter tube was such that 300 grams of feed mixture were passed through the catalyst bed in a period of one hour.

The run was continued for 633 hours during which period the temperature of the catalyst bed was gradually increased to 225° C. At the end of 633 hours the activity of the catalyst had decreased to the extent that less than 75 percent by weight of the phenyl methyl carbinol was being dehydrated to styrene. The feed to the converter tube was then halted and the catalyst bed was exposed to a stream of nitrogen containing 150 parts per million by weight of $SO_3$ per part of nitrogen for a period of one hour, for the purpose of reactivating the catalyst. Introduction of the feed was then resumed and continued until the 662nd hour, when nitrogen containing 150 parts per million by weight of $SO_3$ per part of nitrogen was again substituted for the feed for a period of one hour. Introduction of the feed was again resumed until the 706th hour when the same nitrogen-$SO_3$ was again introduced for a period of one hour.

Continuous operation was then resumed again with the feed mixture being fed at a rate of 300 grams of feed per 300 cubic centimeters of catalyst per hour. After a total of 784 hours of operation the yield of the process was as follows:

| Component: | Parts by weight |
|---|---|
| Styrene | 57.42 |
| Phenyl methyl ketone | 26.97 |
| Phenyl methyl carbinol | 7.83 |
| Residues | 3.75 |
| Styrene dimer | 3.93 |
| Ethyl benzene | 0.10 |
| | 100.00 |

The product mixture contained no alpha-methyl benzyl ether. The percentage dehydration of phenyl methyl carbinol to styrene was 78.6 percent by weight. The purity of the styrene product was 99.82 percent as determined by mass spectrometer analysis.

*Example IX*

A feed mixture comprising 80.56 parts by weight of phenyl methyl carbinol and 19.44 parts by weight of phenyl methyl ketone was vaporized and the vapor was passed through a catalyst bed maintained at a temperature of 220° C. The feed mixture contained twenty-five parts per million by weight of $SO_3$ per part of phenyl methyl carbinol. The catalyst was a mixture of sodium sulfate and sodium acid sulfate, in a one to one weight ratio, deposited on fused aluminum oxide as described in Example I. Prior to the run of this example the catalyst had been run for a total of 1402 hours with a feed containing no $SO_3$, but had ben reactivated as described in Example VIII.

The reaction vessel consisted of a vertical stainless steel converter tube 36 inches in length and having an inside diameter of one inch. The converter tube was equipped with a one-quarter inch outside diameter stainless steel thermowell and was heated by means of an electrically controlled liquid-vapor heat exchange jacket. Three hundred cubic centimeters of catalyst were charged to the bottom of the converter tube and the upper portion of the tube was packed with inert support material, which latter material acted as a vaporizer for the incoming phenyl methyl carbinol in the feed. The feed rate to the converter tube was such that 300 grams of feed mixture were passed through the catalyst bed in a period of one hour.

In the run of this example the process was operated continuously for a period of 1457 hours. During this period the percentage conversion of phenyl methyl carbinol to styrene gradually decreased from 90 percent to 60 percent by weight. The purity of the styrene product varied from 99.86 percent to 99.66 percent as determined by freezing point and mass spectrometer analyses.

*Example X*

A feed mixture comprising 4 parts by weight of phenyl methyl carbinol and 1 part by weight of phenyl methyl ketone was vaporized and the vapor was passed through a converter tube maintained at a temperature of 235° C. The feed mixture contained 180 parts per million of $SO_3$ by weight per part of phenyl methyl carbinol. In place of a solid catalyst in the converter a bed of 300 cubic centimeters of bonded inert silica was employed.

The reaction vessel consisted of a vertical stainless steel converter tube 36 inches in length and having an inside diameter of one inch. The converter tube was equipped with a one-quarter inch outside diameter stainless steel thermowell and was heated by means of an electrically controlled liquid-vapor heat exchange jacket. Three hundred cubic centimeters of bonded inert silica were charged to the bottom of the converter tube and the upper portion of the tube was packed with inert support material, which material acted as a vaporizer for incoming phenyl methyl carbinol in the feed. The feed rate to the converter tube was such that 300 grams of feed mixture were passed through the bonded inert silica bed in a period of one hour.

During 46 hours of continuous operation the average percent of dehydration of phenyl methyl carbinol to styrene was 94 percent by weight. The purity of the styrene thus produced was 99.7 percent, as determined by mass spectrometer analysis.

*Example XI*

A feed mixture comprising 4 parts by weight of phenyl methyl carbinol and one part by weight of phenyl methyl ketone was vaporized and the vapor was passed through a catalyst bed maintained at a temperature of 225° C. The feed mixture also contained $SO_3$ in an amount varying from 8 to 15 parts per million by weight per part of phenyl methyl carbinol. The catalyst bed consisted of sodium sulfate deposited on a bonded inert silica carrier as described in Example IV. Sodium sulfate alone is not a catalyst for the dehydration reaction, but is activated in the presence of $SO_3$.

The reaction vessel consisted of a vertical stainless steel converter tube 36 inches in length and having an inside diameter of one inch. The converter tube was equipped with a one-quarter inch outside diameter stainless steel thermowell and was heated by means of an electrically controlled liquid-vapor heat exchange jacket. Three hundred cubic centimeters of catalyst bed were charged to the bottom of the converter tube and the upper portion of the tube was packed with inert support material, which latter material acted as a vaporizer for the incoming phenyl methyl carbinol in the feed. The feed rate to the converter tube was such that 300 grams of feed mixture were passed through the catalyst bed in a period of one hour.

During 400 hours of continuous operation the average percentage of dehydration of phenyl methyl carbinol to styrene was 91 percent by weight. The purity of the styrene thus produced was 99.84 percent, as determined by mass spectrometer analysis.

*Example XII*

A feed mixture comprising 81.54 parts by weight of phenyl methyl carbinol and 18.46 parts by weight of phenyl methyl ketone was vaporized and the vapor was passed through a catalyst bed maintained at a temperature of 220° C. The feed mixture contained 30 parts per million by weight of 100 percent sulfuric acid per part of phenyl methyl carbinol. The catalyst bed was a mixture of sodium sulfate and sodium acid sulfate, in a one to one weight ratio, deposited on fused aluminum oxide as described in Example I. However, the catalytic activity of the catalyst bed had been exhausted by previous operation, prior to the experiment of this example. While in the course of the experiment of this example there may have been some reactivation of the catalyst bed by the sulfuric acid in the feed, it is believed that the major portion of the catalytic effect was due to the sulfuric acid itself.

The reaction vessel consisted of a vertical stainless steel converter tube 36 inches in length and having an inside diameter of one inch. The converter tube was equipped with a one-quarter inch outside diameter stainless steel thermowell and was heated by means of an electrically controlled liquid-vapor heat exchange jacket. Three hundred cubic centimeters of catalyst bed were charged to the bottom of the converter tube and the upper portion of the tube was packed with inert support material, which latter material acted as a vaporizer for the incoming phenyl methyl carbinol in the feed. The feed rate to the converter tube was such that 300 grams of feed mixture were passed through the catalyst bed in a period of one hour.

During 3 hours of continuous operation the average percentage of dehydration of phenyl methyl carbinol to styrene was 80.0 percent by weight. The purity of the styrene thus produced was 99.8 percent, as determined by mass spectrometer analysis.

*Example XIII*

A feed mixture comprising 82 parts by weight of phenyl methyl carbinol and 18 parts by weight of phenyl methyl ketone was vaporized and the vapor was passed through a catalyst bed maintained at a temperature of 225° C. The feed mixture contained 100 parts per million by weight of diethyl sulfate per part of phenyl methyl carbinol. The catalyst bed consisted of sodium sulfate deposited on fused aluminum oxide as described in Example XVI. Prior to the run of this example this catalyst bed had been activated by exposing it to a stream of nitrogen containing 150 parts per million by weight of sulfur trioxide per part of nitrogen, at a temperature of about 225° C. for a period of 16 hours. After this activation the catalytic activity of the bed had then been exhausted by a run with a phenyl methyl carbinol feed of the same composition as that used in the run of this example, all of this being done prior to the run of this example.

The reaction vessel consisted of a vertical stainless steel converter tube 36 inches in length and having an inside diameter of one inch. The converter tube was equipped with a one-quarter inch outside diameter stainless steel thermowell and was heated by means of an electrically controlled liquid-vapor heat exchange jacket. Three hundred cubic centimeters of catalyst bed were charged to the bottom of the converter tube and the upper portion of the tube was packed with inert support material, which latter material acted as a vaporizer for the incoming phenyl methyl carbinol in the feed. The feed rate to the converter tube was such that 300 grams of feed mixture were passed through the catalyst bed in a period of one hour.

The yield of the process for a six hour run was as follows:

| Component: | Parts by weight |
| --- | --- |
| Styrene | 57.3 |
| Phenyl methyl ketone | 18.16 |
| Phenyl methyl carbinol | 15.12 |
| Alpha-methyl benzyl ether | 6.58 |
| Styrene dimer | 0.92 |
| Ethyl benzene | 0.17 |
| Residues | 1.32 |
| | 99.57 |

The percentage dehydration of phenyl methyl carbinol to styrene was 81.53 percent by weight. The purity of the styrene thus produced was 99.71 percent as determined by mass spectrometer and freezing point analyses.

*Example XIV*

A feed mixture comprising 82 parts by weight of phenyl methyl carbinol and 18 parts by weight of phenyl methyl ketone was vaporized and the vapor was passed through a catalyst bed maintained at a temperature of 225° C. The feed mixture also contained 25 parts per million by weight of 100 percent sulfuric acid per part of phenyl methyl carbinol. The catalyst bed consisted of 300 cubic centimeters of inert fused alumina oxide pellets.

The reaction vessel consisted of a vertical stainless steel converter tube 36 inches in length and having an inside diameter of one inch. The converter tube was equipped with a one-quarter inch outside diameter stainless steel thermowell and was heated by means of an electrically controlled liquid-vapor heat exchange jacket. Three hundred cubic centimeters of catalyst bed were charged to the bottom of the converter tube and the upper portion of the tube was packed with inert support material, which latter material acted as a vaporizer for the incoming phenyl methyl carbinol in the feed. The feed rate to the converter tube was such that 300 grams of feed mixture were passed through the catalyst bed in a period of one hour.

The yield of the process for a one hour run was as follows:

| Component: | Parts by weight |
| --- | --- |
| Styrene | 51.81 |
| Phenyl methyl ketone | 18.54 |
| Phenyl methyl carbinol | 25.01 |
| Alpha-methyl benzyl ether | 4.49 |
| Ethyl benzene | 0.15 |
| | 100.00 |

The product mixture contained no styrene dimer or residue. The percentage dehydration of phenyl methyl carbinol to styrene was 64 percent by weight. The purity of the styrene product was in excess of 99.7 percent as determined by mass spectrometer analysis.

*Example XV*

A feed mixture comprising 82 parts by weight of phenyl methyl carbinol and 18 parts by weight of phenyl methyl ketone was vaporized and the vapor was passed through a catalyst bed maintained at a temperature of 225° C. The feed mixture also contained 125 parts per million by weight of 100 percent sulfuric acid per part of phenyl methyl carbinol. The catalyst bed consisted of 300 cubic centimeters of inert fused aluminum oxide pellets.

The reaction vessel consisted of a vertical stainless steel converter tube 36 inches in length and having an inside diameter of one inch. The converter tube was equipped with a one-quarter inch outside diameter stainless steel thermowell and was heated by means of an electrically controlled liquid-vapor heat exchange jacket. Three hundred cubic centimeters of catalyst bed were charged to the bottom of the converter tube and the upper portion of the tube was packed with inert support material, which latter material acted as a vaporizer for the incoming phenyl methyl carbinol in the feed. The feed rate to the converter tube was such that 300 grams of feed mixture were passed through the catalyst bed in a period of one hour.

The yield of the process for a one hour run was as follows:

| Component: | Parts by weight |
| --- | --- |
| Styrene | 71.36 |
| Phenyl methyl ketone | 19.68 |
| Phenyl methyl carbinol | 6.47 |
| Alpha-methyl benzyl ether | 0.45 |
| Ethyl benzene | 0.21 |
| Styrene dimer | 1.80 |
| | 99.97 |

The product mixture contained no residues. The percentage dehydration of phenyl methyl carbinol was 90 percent by weight. The purity of the styrene product was in excess of 99.7 percent as determined by mass spectrometer analysis.

*Example XVI*

A catalyst bed was prepared in the following manner. One part by weight of sodium sulfate was dissolved in 1.5 parts by weight of distilled water at a temperature between 95° C. and 100° C. This solution was mixed with 4 parts by weight of a carrier consisting of approximately 2 x 4 mesh size ovoid shaped fused aluminum oxide pellets. This mixture was evaporated to dryness with constant agitation, employing a temperature of about 120° C. The catalyst pellets thus obtained had the salt bonded tightly to the carrier.

*Example XVII*

A feed mixture comprising 84 parts by weight of phenyl methyl carbinol and 16 parts by weight of phenyl methyl ketone was vaporized and the vapor was passed through a catalyst bed maintained at a temperature of 225° C. The feed mixture also contained 50 parts per million of 100 percent sulfuric acid per part of phenyl methyl carbinol. The catalyst bed consisted of sodium sulfate deposited on an inert aluminum oxide carrier as described in Example XVI. Sodium sulfate alone is not a catalyst for the dehydration reaction, but is activated in the presence of sulfuric acid.

The reaction vessel consisted of a vertical stainless steel converter tube 36 inches in length and having an inside diameter of one inch. The converter tube was equipped with a one-quarter inch outside diameter stainless steel thermowell and was heated by means of an electrically controlled liquid-vapor heat exchange jacket. Three hundred cubic centimeters of catalyst bed were charged to the bottom of the converter tube and the upper portion of the tube was packed with inert support material, which latter material acted as a vaporizer for the incoming phenyl methyl carbinol in the feed. The feed rate to the converter tube was such that 300 grams of feed mixture were passed through the catalyst bed in a period of one hour.

The process was operated in this manner for a period of 55 hours during which time the percentage dehydration of phenyl methyl carbinol to styrene was sixty percent by weight. The purity of the styrene thus produced was above 99.7 percent as determined by mass spectrometer analysis.

What is claimed is:

1. Process for reactivating a spent catalyst bed consisting essentially of a mixture of an alkali metal sulfate and an alkali metal acid sulfate supported on an inert carrier, which process comprises contacting said bed with sulfuric acid at a temperature about 100° C. to 250° C.

2. Process for reactivating a spent catalyst bed consisting essentially of a mixture of sodium sulfate and sodium acid sulfate supported on an inert carrier, which process comprises contacting said bed with sulfuric acid at a temperature about 100° C. to 250° C.

3. Process for reactivating a spent catalyst bed consisting essentially of a mixture of potassium sulfate and potassium acid sulfate supported on an inert carrier, which process comprises contacting said bed with sulfuric acid at a temperature about 100° C. to 250° C.

4. Process for reactivating a spent catalyst bed consisting essentially of a mixture of an alkali metal sulfate and an alkali metal acid sulfate supported on an inert carrier, which process comprises contacting said bed with a sulfur compound capable of yielding sulfuric acid at a temperature about 100° C. to 250° C.

5. Process for reactivating a spent catalyst bed consisting essentially of a mixture of an alkali metal sulfate and an alkali metal acid sulfate supported on an inert carrier, which process comprises contacting said bed with sulfur trioxide at a temperature about 100° C. to 250° C.

6. Process for reactivating a spent catalyst bed consisting essentially of a mixture of an alkali metal sulfate and an alkali metal acid sulfate supported on an inert carrier, which process comprises contacting said bed with a lower alkyl sulfate at a temperature about 100° C. to 250° C.

7. Process for reactivating a spent catalyst bed consisting essentially of a mixture of an alkali metal sulfate and an alkali metal acid sulfate supported on an inert carrier, which process comprises contacting said bed with dimethyl sulfate at a temperature about 100° C. to 250° C.

8. Process for reactivating a spent catalyst bed consisting essentially of a mixture of an alkali metal sulfate and an alkali metal acid sulfate supported on an inert carrier, which process comprises contacting said bed with methyl hydrogen sulfate at a temperature about 100° C. to 250° C.

9. Process for reactivating a spent catalyst bed consisting essentially of a mixture of an alkali metal sulfate and an alkali metal acid sulfate supported on an inert carrier, which process comprises contacting said bed with diethyl sulfate at a temperature about 100° C. to 250° C.

10. Process for reactivating a spent catalyst bed consisting essentially of a mixture of an alkali metal sulfate and an alkali metal acid sulfate supported on an inert carrier, which process comprises contacting said bed with diisopropyl sulfate at a temperature about 100° C. to 250° C.

References Cited by the Examiner
UNITED STATES PATENTS

| | | | |
|---|---|---|---|
| 2,289,966 | 7/42 | Herstein | 252—413 |
| 2,542,551 | 2/51 | McKeever et al. | 260—669 |
| 2,889,201 | 6/59 | Horiuti et al. | 252—413 |
| 2,992,189 | 7/61 | Friedman et al. | 252—413 |

MAURICE A. BRINDISI, *Primary Examiner.*